June 14, 1960

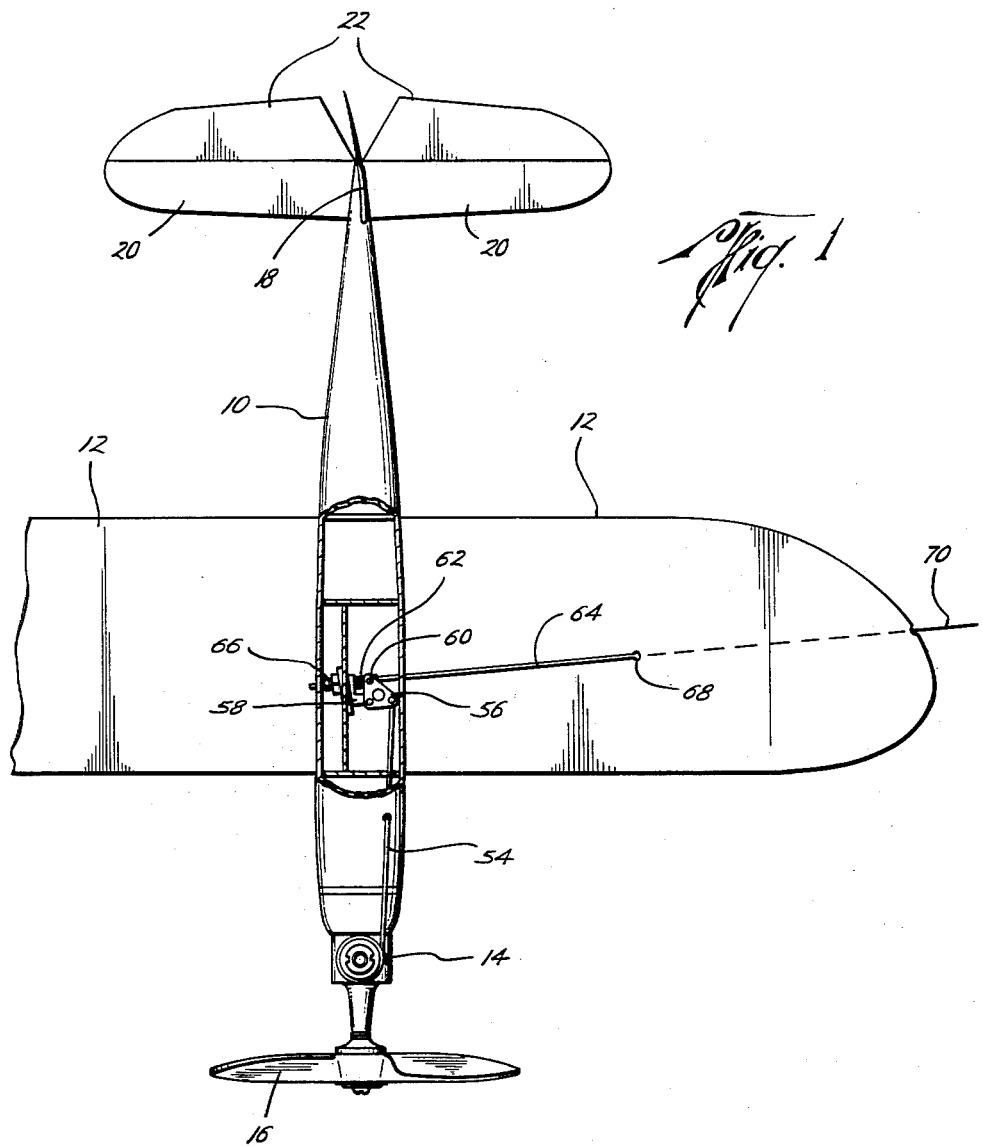

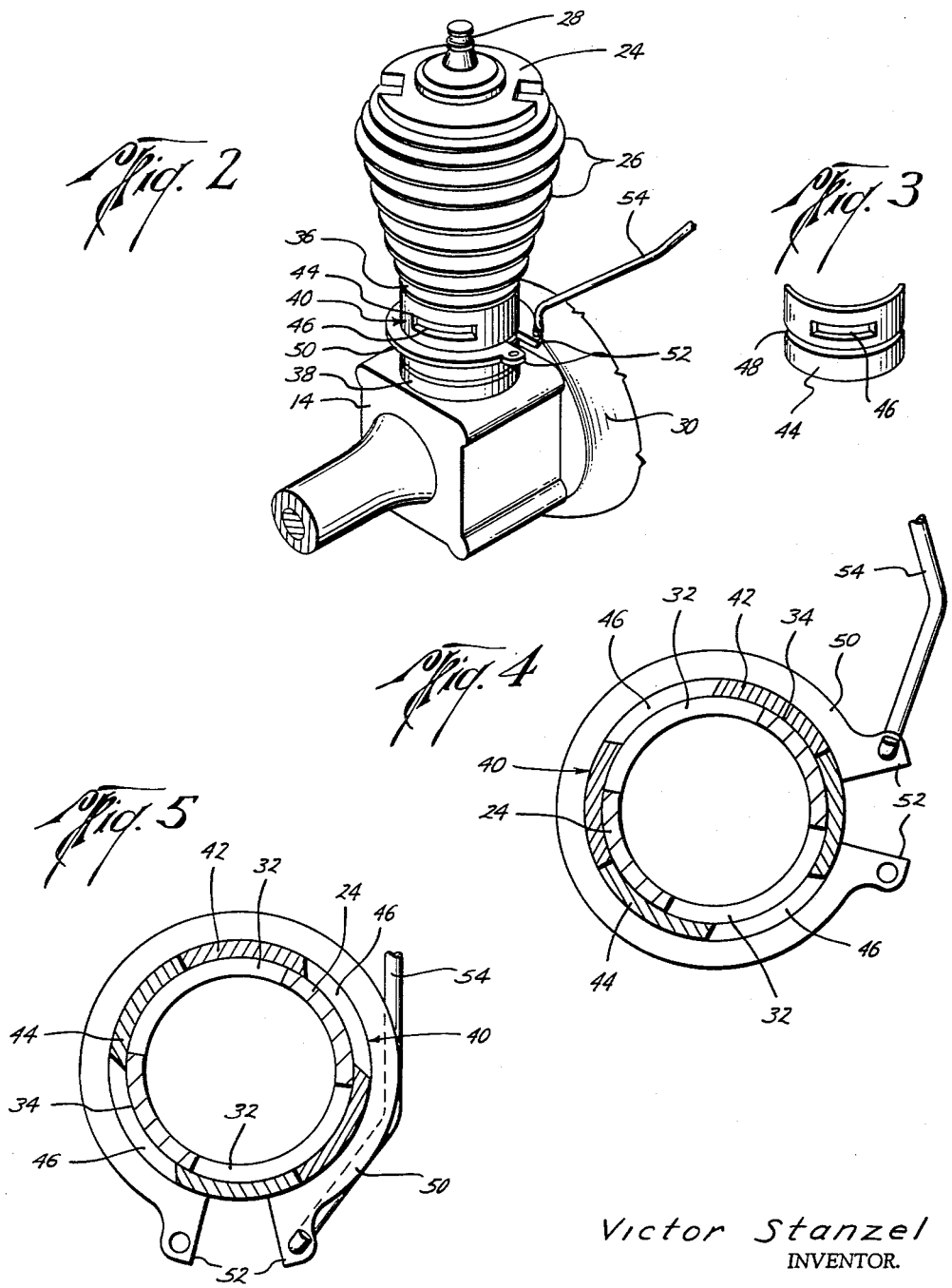

V. STANZEL 2,940,434

SPEED CONTROLLING MECHANISM FOR MODEL AIRCRAFT ENGINES

Filed Feb. 3, 1958

Victor Stanzel
INVENTOR.

BY Charles E. Lightfoot
ATTORNEY

United States Patent Office 2,940,434
Patented June 14, 1960

2,940,434

SPEED CONTROLLING MECHANISM FOR MODEL AIRCRAFT ENGINES

Victor Stanzel, P.O. Box 171, Schulenburg, Tex.

Filed Feb. 3, 1958, Ser. No. 712,873

4 Claims. (Cl. 123—107)

This invention relates to internal combustion engines, and more particularly to throttle mechanism for model airplane engines by which the speed of such engines may be controlled.

Model airplane engines of the internal combustion type, as heretofore commonly constructed, are provided with a single cylinder intended to be operated at high speeds, such as 10000 to 18000 revolutions per minute, and such engines are not readily adapted for speed control by ordinary means such as by regulation of the fuel intake to the cylinder. Heretofore no satisfactory method has been available for regulating the speed of such engines, and once started engines of this kind continue to operate at full speed until the supply of fuel is exhausted.

The present invention has for an important object the provision of speed regulating mechanism for internal combustion engines of the kind referred to which is operated independently of the fuel supply of the engine.

Another object of the invention is the provision of speed regulating mechanism for an internal combustion engine of the kind mentioned embodying means for adjustably restricting the discharge of exhaust gases from the combustion chamber of the engine.

A further object of the invention is to provide speed controlling mechanism for internal combustion engines of model aircraft which may be adjusted to regulate the speed of the craft while the same is in flight.

Another object of the invention is the provision of speed controlling mechanism for internal combustion engines of the kind referred to which is easily applied to existing engines without altering the structure of the same or modifying the existing intake and exhaust mechanism of the engine.

A still further object of the invention is to provide speed controlling mechanism for model aircraft engines of the internal combustion type, which is of simple design and economical manufacture, and which is capable of withstanding the extreme conditions of wear and hard usage to which mechanism of this kind is likely to be subjected.

The above and other important objects and advantages of the invention may best be understood from the following detailed description, constituting a specification of the same when considered in conjunction with the annexed drawings, wherein:

Figure 1 is a fragmentary top plan view of a model airplane, broken away and partly in cross-section and on a somewhat reduced scale, illustrating the invention and showing a preferred form of mechanism whereby adjustment of the speed controlling mechanism of the invention may be accomplished while the plane is in flight;

Figure 2 is a fragmentary perspective view of the invention as applied to an internal combustion engine of the type used on model aircraft;

Figure 3 is a perspective view showing one segment of the valve of the speed controlling mechanism of the invention as illustrated in Figure 2, separated from the surrounding structure of the mechanism;

Figure 4 is a horizontal cross-sectional view on an enlarged scale of the speed controlling mechanism of the invention as illustrated in Figure 2 showing the same in its fully opened or maximum speed position;

Figure 5 is a view similar to that of Figure 4 showing the speed controlling mechanism in its fully closed position;

Figure 7:
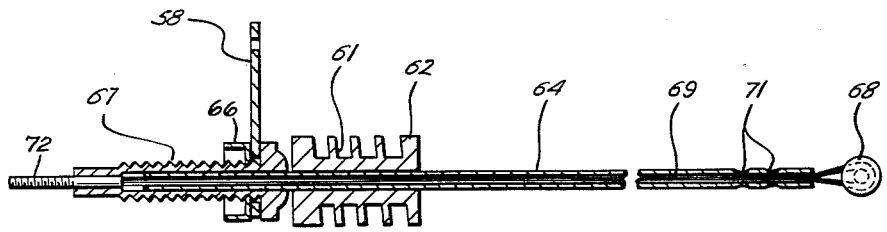
Figure 7 is a longitudinal cross-sectional view of the actuating means as illustrated in Figure 6.

Referring now to the drawings in greater detail, the invention is illustrated herein in connection with its application to the control of the speed of model aircraft engines of the internal combustion type. In Figure 1 there is illustrated a model airplane of conventional construction having a fuselage 10 provided with lateral wings 12, 12 and equipped with an engine 14 of the internal combustion type suitably located forwardly of the wings 12, 12 and arranged to drive a conventional propeller 16. The airplane is also provided with a tail structure of usual design having a vertical fin 18, stabilizer 20 and elevators 22.

The engine 14, as best illustrated in Figure 2, is of the conventional internal combustion type, having a single cylinder 24 provided with a series of heat dissipating fins 26 for air cooling and having the usual electrode 28 adapted to be connected to one terminal of a battery whose other terminal is grounded on the body of the cylinder to provide ignition of the fuel in starting the engine. The engine is of a type which is adapted for ignition by the heat of the combustion of the fuel once the engine has been started. A fuel reservoir 30 is provided on the engine from which fuel is supplied to the combustion chamber within the cylinder in the usual manner under the control of suitable mechanism such as a needle valve, not shown. The engine has one or more slit like exhaust ports 32 in the cylinder 24 located in a portion 34 thereof of cylindrical external shape below the fins 26 in a position such that the piston of the engine passes downwardly to a point below the exhaust ports at the end of the power stroke of the piston to permit the discharge of exhaust gases. During compression and ignition the piston is positioned to close the exhaust ports 32. The portion 34 of the cylinder, containing the exhaust ports 32 which are in communication with the interior of the cylinder and with the exterior thereof is of somewhat smaller external diameter than the portions of the cylinder above and beneath the same to provide annular shoulders 36 and 38 on the cylinder at the upper and lower extremities of the portion 34, as best seen in Figure 2.

For the purpose of regulating the discharge of exhaust gases from the cylinder through the exhaust ports 32, whereby the speed of the engine may be controlled, an external, sleeve-like, valve member generally designated 40, is movably positioned around the portion 34 of the cylinder for rotation thereon.

The valve member 40 may be formed in two sections 42 and 44 of semi-circular shape in cross-section for convenient assembling about the cylinder portion 34 between and in abutment with the shoulders 36 and 38. Each of the valve sections 42 and 44 has a slit-like port 46 therethrough, positioned to be moved into and out of substantial registration with one of the exhaust ports 32 of the cylinder by rotation of the valve member on the cylinder. In the present illustration the slit-like ports 46 are of somewhat shorter length than the lengths of the exhaust ports 32 and the portions of the cylinder intervening the ports 32, so that the exhaust ports 32 will be completely closed in one position of the member 40. The sleeve sections 42 and 44 are each provided with an external peripheral groove 48, as best seen in Figure 3, to form an external peripheral groove about the valve member when the parts are assembled and into which a snap ring 50 may be inserted to hold the sections in assembled relation on the cylinder.

The snap ring 50 is of usual construction having external, radially outwardly extending, lug portions 52 at its ends which are perforated for the connection thereto of one end of an operating link or shaft 54 by which the ring and the valve member 40 may be rotated about the cylinder to position the ports 46 in any desired relation to the exhaust ports 32 to control the speed of the engine. The snap ring 50 holds the sections 42 and 44 in tightly assembled relation about the cylinder and the sections are shaped to fit closely but sufficiently free on the cylinder when so assembled so that the valve member 40 will rotate freely with the ring about the cylinder. The relative positions of the ports 46 of the valve sections and the ports 32 in any position of the ring 50 may be readily adjusted by holding the ring 50 stationary while rotating the valve member 40 relative thereto to the desired position.

Figure 6:
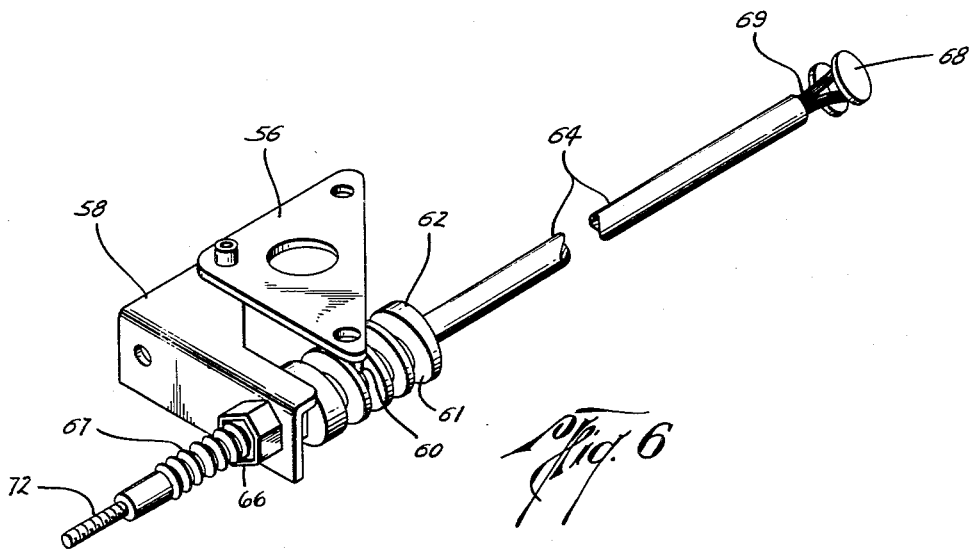
Figure 6 is a perspective view on an enlarged scale illustrating the actuating means for the contact mechanism of the invention detached from the plane and showing the details of construction of the actuating means.

Suitable mechanism is provided for moving the link or shaft 54 to adjust the position of the valve 40, such as that shown in Figures 1, 6 and 7, wherein a bell crank 56 is pivotally supported on a bracket 58 attached to some convenient portion of the fuselage of the aircraft, and one arm of which is pivotally connected to the shaft 54, while the other arm of the bell crank has a pin 60, which extends into a spiral groove 61 formed on cam member 62 mounted on a tubular shaft 64, for rotation therewith. The shaft 64 is rotatably extended into a counterbore in a tubular bearing member 67 which extends through an opening in the bracket 58, and is provided with a nut 66, threaded thereon to attach the shaft to the bracket. A torsion wire 69 extends through the tubular shaft 64 and is attached at one end to the shaft, as by crimping the shaft as shown at 71. The torsion wire is also attached at its other end to an anchoring element 72 which is anchored in the bearing member 67 and the wire has a fitting or button 68 at its outer end for the attachment thereto of a torsion line 70 whereby the shaft may be rotated by rotation of the line to rotate the cam 62. By this arrangement the torsion wire maintains the cam with the pin 60 of the bell crank in a central position longitudinally of the cam until the cam is rotated in one direction by rotating the torsion line 70 to rock the bell crank to exert a pull on the shaft 54, or the torsion line may be rotated in the other direction to rotate the cam in a direction to rock the bell crank to exert a push on the shaft 54.

Other suitable mechanism may, of course, be substituted for the above described cam and bell crank mechanism for actuating the shaft 54 by a line or other means to move the valve member 40 to adjust the relative positions of the ports 32 and 46, whereby the exhaust from the cylinder may be more or less restricted to regulate the speed of the engine.

In the operation of the speed controlling mechanism the engine may be started with the valve member 40 in its fully open position, as illustrated in Figure 4, in which position a minimum of restriction is placed on the outflow of the exhaust gases from the cylinder, and when the engine is running the speed of the engine may be reduced by moving the valve member 40 from the position of Figure 4 toward the position of Figure 5. The exhaust from the engine may also be substantially completely shut off by moving the valve member to the position of Figure 5 to stop the engine.

It will thus be seen that the invention, constructed and operated in the manner described, provides speed control mechanism which is of simple design and which is easily and accurately operated by a single control line without interfering with other mechanism which may be employed for regulating the operation of the aircraft.

The invention has been disclosed herein in connection with a particular embodiment of the same, but it will be understood that this is intended by way of illustration only and that numerous changes can be made in the construction and arrangement of the various parts without departing from the spirit of the invention or the scope of the appended claims.

Having thus clearly shown and described the invention, what is claimed as new and desired to secure by Letters Patent is:

1. In speed controlling mechanism for an internal combustion engine having a cylinder whose side wall is substantially circular in cross-section and provided with an exhaust port in said side wall, semi-cylindrical sections adapted to be assembled about the exterior of said wall, means extending about the exterior of said sections in engagement therewith to hold the sections in assembled relation to form a tubular member movably positioned on the cylinder for rotation thereon, one of said sections having an opening therethrough positioned to be moved into and out of registration with said port upon rotation of the tubular element on the cylinder to open and close said port.

2. In speed controlling mechanism for an internal combustion engine having a cylinder whose side wall is substantially circular in cross-section and provided with an exhaust port in said side wall, said side wall having a portion of reduced external diameter mediate its ends to form longitudinally spaced, opposed, external, annular shoulders on the cylinder, semi-cylindrical sections adapted to be assembled about said reduced portion of said side wall, means for holding the sections in assembled relation to form a tubular member movably positioned on the cylinder for rotation thereon and whose ends are positioned for abutting engagement with said shoulders to hold the member against longitudinal movement relative to the cylinder, one of said sections having an opening therethrough positioned to be moved into and out of registration with said port to open and close the port.

3. In speed controlling mechanism for an internal combustion engine having a cylinder whose side wall is substantially circular in cross-section and provided with a peripherally elongated exhaust port in said side wall, semi-cylindrical sections adapted to be assembled externally about said side wall, each of said sections having an external groove positioned for alignment with the groove of the other section to form a substantially continuous peripheral groove about the exterior of the sections, a resilient element removably positioned in said peripheral groove and shaped for coaction with the sections to yieldingly hold the sections in assembled relation to form a tubular member movably positioned on the cylinder for rotation thereon, said member having a peripherally elongated opening therethrough positioned to be moved into and out of registration with said port to open and close the port.

4. In speed controlling mechanism for an internal combustion engine having a cylinder whose side wall is substantially circular in cross-section and provided with an exhaust port in said side wall, said side wall having a portion of reduced external diameter mediate its ends to form longitudinally spaced, opposed, external, annular shoulders on the cylinder, semi-cylindrical sections adapted to be assembled about said reduced portion of said side wall, each of said sections having an external groove positioned for alignment with the groove of the other section to form a substantially continuous, annular groove about the exterior of the sections when assembled, a resilient element removably positioned in said annular groove and shaped for coaction with the sections to yieldingly hold the sections in assembled relation to form a tubular member movably positioned on the cylinder for rotation thereon and whose ends are positioned for abutting engagement with said shoulders to hold the member against longitudinal movement relative to the cylinder, one of said sections having an opening therethrough positioned to be moved into and out of registration with said port to open and close the port.

References Cited in the file of this patent

UNITED STATES PATENTS

| | | |
|---|---|---|
| 1,093,317 | Crouch et al. | Apr. 14, 1914 |
| 1,138,919 | Willey et al. | May 11, 1915 |
| 2,401,932 | Heintz | June 11, 1946 |
| 2,543,965 | Hamilton | Mar. 6, 1951 |
| 2,570,316 | Burks | Oct. 9, 1951 |
| 2,806,458 | Mettetal | Sept. 17, 1957 |
| 2,810,373 | Lang | Oct. 22, 1957 |

FOREIGN PATENTS

| | | |
|---|---|---|
| 558,610 | France | Oct. 23, 1922 |
| 572,883 | Great Britain | Oct. 26, 1945 |